United States Patent
Tsuzuki

(10) Patent No.: US 11,492,003 B2
(45) Date of Patent: Nov. 8, 2022

(54) OBJECT SENSING DEVICE

(71) Applicant: DENSO CORPORATION, Kariya (JP)

(72) Inventor: Takeo Tsuzuki, Kariya (JP)

(73) Assignee: DENSO CORPORATION, Aichi-pref (JP)

( * ) Notice: Subject to any disclaimer, the term of this patent is extended or adjusted under 35 U.S.C. 154(b) by 195 days.

(21) Appl. No.: 16/905,682

(22) Filed: Jun. 18, 2020

(65) Prior Publication Data

US 2020/0317217 A1 Oct. 8, 2020

Related U.S. Application Data

(63) Continuation of application No. PCT/JP2018/042355, filed on Nov. 15, 2018.

(30) Foreign Application Priority Data

Dec. 20, 2017 (JP) .............................. JP2017-244295

(51) Int. Cl.
*B60W 50/14* (2020.01)
*B60W 50/02* (2012.01)

(52) U.S. Cl.
CPC ........ *B60W 50/14* (2013.01); *B60W 50/0205* (2013.01); *B60W 2050/143* (2013.01);
(Continued)

(58) Field of Classification Search
CPC ............. B60W 50/14; B60W 50/0205; B60W 2420/54; B60W 2520/10; B60W 2554/20; B60W 2554/802
See application file for complete search history.

(56) References Cited

U.S. PATENT DOCUMENTS 7,379,389 B2 * 5/2008 Aikyo ..................... G01S 15/86
367/128
2001/0012238 A1 * 8/2001 Iwasaki ................. G01S 15/931
367/99
(Continued)

FOREIGN PATENT DOCUMENTS

JP  63-033684 A    2/1988
JP  63033684 A  *  2/1988 ............. G01S 15/04
(Continued)

*Primary Examiner* — Peter D Nolan
*Assistant Examiner* — Tanya C Sienko
(74) *Attorney, Agent, or Firm* — Maschoff Brennan

(57) ABSTRACT

An object sensing device is configured to sense an object therearound using an ultrasonic sensor. The object sensing device comprises: a distance judgment portion that performs a judgement of a distance to the object therearound in accordance with received ultrasonic waves that are based on transmitted ultrasonic waves by the ultrasonic sensor; and a notification control portion that performs a predetermined notification operation in accordance with the received ultrasonic waves that are based on the transmitted ultrasonic waves. The notification control portion performs the predetermined notification operation when the distance judgement portion has continuously judged that the object is within a predetermined close range. The notification control portion fails to perform the predetermined notification operation when a judgement history of the distance to the object by the distance judgement portion indicates an abnormal appearance of the object within the predetermined close range.

6 Claims, 6 Drawing Sheets

(52) U.S. Cl.
CPC ... *B60W 2050/146* (2013.01); *B60W 2420/54* (2013.01); *B60W 2520/10* (2013.01); *B60W 2554/20* (2020.02); *B60W 2554/802* (2020.02)

(56) References Cited

U.S. PATENT DOCUMENTS

| | | | |
|---|---|---|---|
| 2002/0023498 A1* | 2/2002 | Tsuzuki | G01N 29/12 73/609 |
| 2016/0207532 A1* | 7/2016 | Kida | B60W 10/04 |
| 2018/0156916 A1 | 6/2018 | Nomura et al. | |

FOREIGN PATENT DOCUMENTS

| | | | | |
|---|---|---|---|---|
| JP | 2003-248050 A | | 9/2003 | |
| JP | 2003248050 A | * | 9/2003 | ............... G01S 7/52 |
| JP | 2016-016723 A | | 2/2016 | |
| JP | 2016016723 A | * | 2/2016 | ............ B60R 20/00 |
| JP | 2017-090409 A | | 5/2017 | |

\* cited by examiner

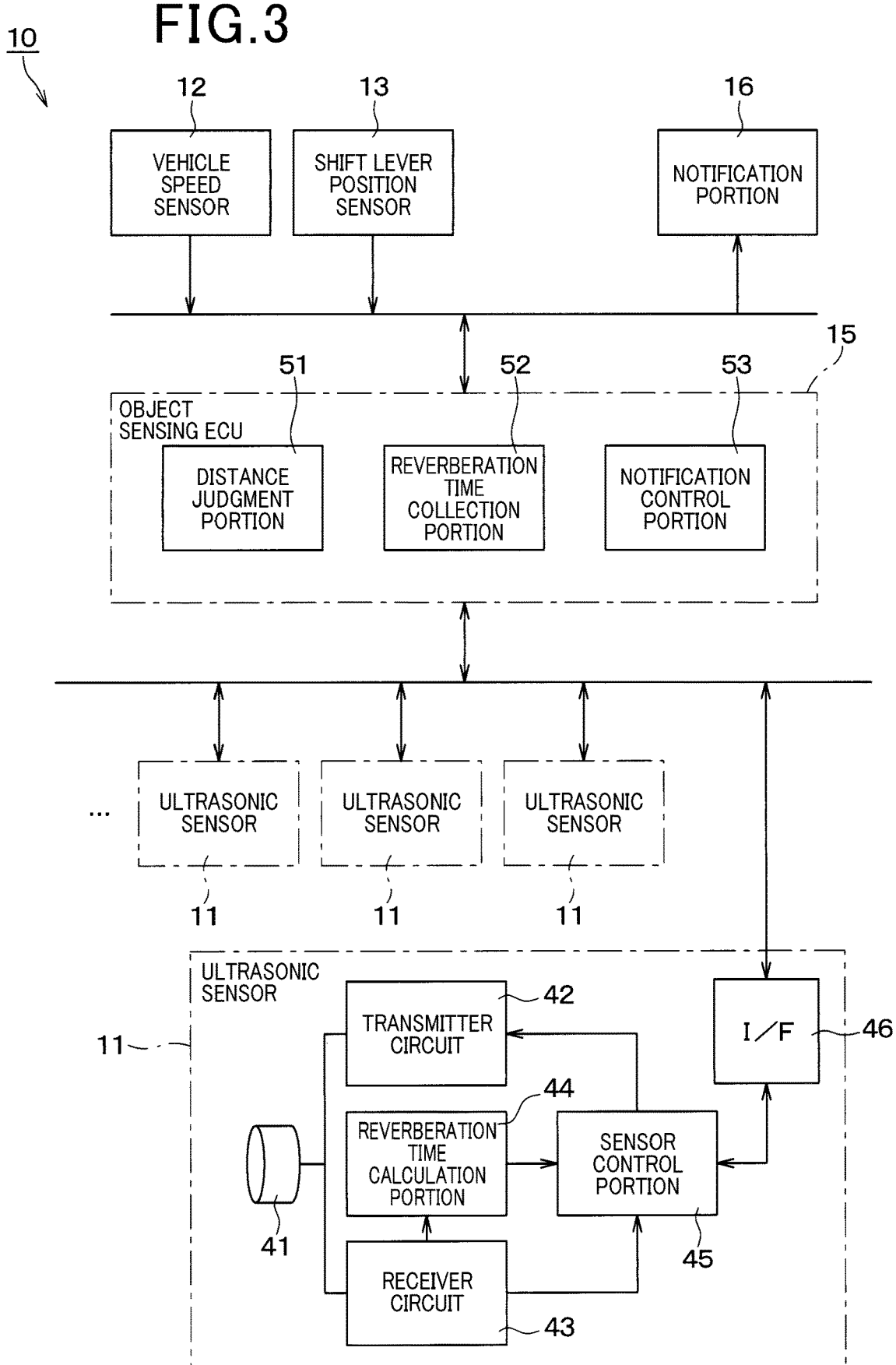

OBJECT SENSING DEVICE

CROSS-REFERENCE TO RELATED APPLICATION

The present application is a continuation application of International Application No. PCT/JP2018/042355, filed on Nov. 15, 2018, which claims priority to Japanese Patent Application No. 2017-244295, filed on Dec. 20, 2017. The contents of these applications are incorporated herein by reference in their entirety.

BACKGROUND

Technological Field

The present disclosure relates to an object sensing device that is configured to sense an object therearound by an ultrasonic sensor.

Background Art

As such a type of device, a device described below is known. This device judges whether an object sensed by an ultrasonic sensor in close proximity has been sensed constantly for more than a predetermined period of time. If an object has been sensed constantly for a certain period of time since it was first sensed in close proximity, it means that an own vehicle has been driving without a collision with the object. So, this device judges that the sensed object is a foreign substance attached to the ultrasonic sensor.

SUMMARY

In the present disclosure, provided is an object sensing device as the following. The object sensing device comprises: a distance judgment portion and a notification control portion. The notification control portion is configured to: perform a predetermined notification operation when the distance judgement portion has continuously judged that an object is within a predetermined close range; and fail to perform the predetermined notification operation when a judgement history of the distance to the object by the distance judgement portion indicates an abnormal appearance of the object within the predetermined close range.

BRIEF DESCRIPTION OF THE DRAWINGS

FIG. 3 is a block diagram schematically illustrating a functional configuration of the object sensing device exemplified in FIG. 1.

DETAILED DESCRIPTION OF THE PREFERRED EMBODIMENTS

[PTL 1] JP-2015-049665 A

Figure 1:
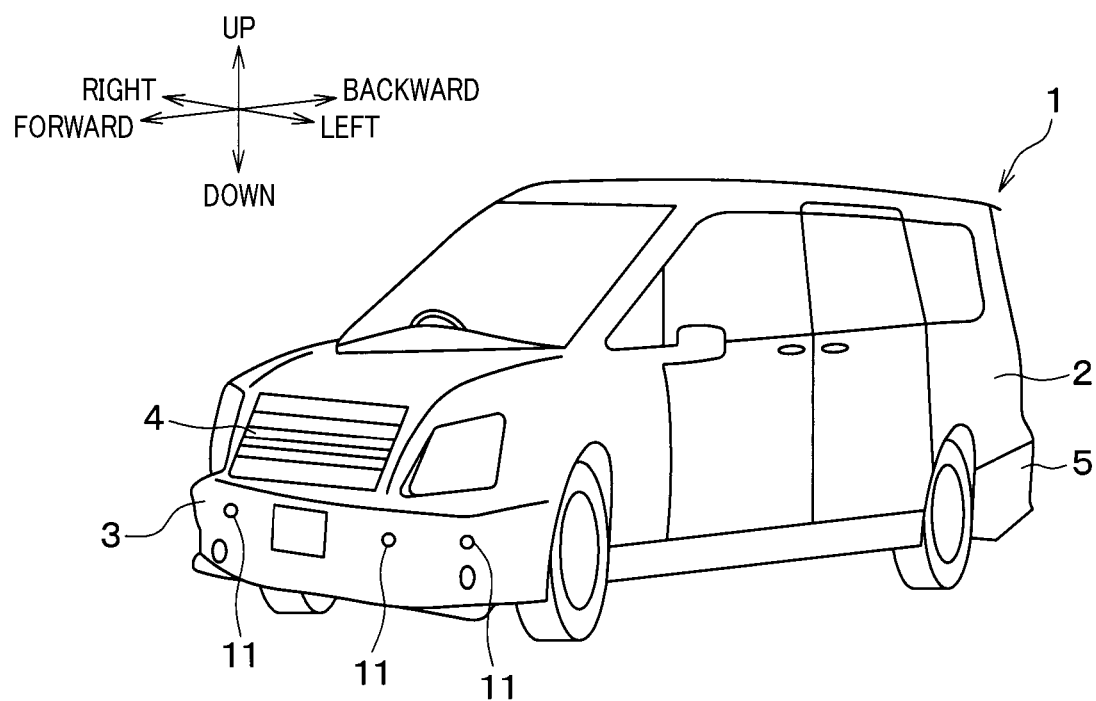
FIG. 1 is a perspective view illustrating an exterior of a vehicle provided with an object sensing device according to one embodiment.

In Patent Literature 1, when it rains heavily, the ultrasonic sensor is constantly subjected to water flow. Under such circumstances, the resonance frequency of the ultrasonic sensor tends to change, causing the reverberation time to become longer.

Under the circumstances, it is possible that an object is abnormally sensed in close proximity when there is actually no object therearound. Specifically, when an object has been sensed in close proximity constantly for more than a predetermined period of time, even if the object is actually not a foreign substance attached to the ultrasonic sensor, the device disclosed in Patent Literature 1 may abnormally judge the attachment of a foreign substance.

The present disclosure is made in consideration of the background described above as an example. In other words, the present disclosure provides a configuration that is capable of minimizing abnormal detections under circumstances where an ultrasonic sensor is constantly subjected to water flow.

The object sensing device described in one aspect is configured to sense an object therearound using an ultrasonic sensor. This object sensing device comprises:

a distance judgment portion that performs a judgement of a distance to the object therearound in accordance with received ultrasonic waves that are based on transmitted ultrasonic waves by the ultrasonic sensor; and a notification control portion that performs a predetermined notification operation in accordance with the received ultrasonic waves that are based on the transmitted ultrasonic waves.

The notification control portion is configured to:

perform the predetermined notification operation when the distance judgement portion has continuously judged that the object is within a predetermined close range; and fail to perform the predetermined notification operation when a judgement history of the distance to the object by the distance judgement portion indicates an abnormal appearance of the object within the predetermined close range.

According to the above-described configuration, the distance judgment portion performs a judgement of a distance to the object therearound in accordance with received ultrasonic waves that are based on transmitted ultrasonic waves by the ultrasonic sensor, and the notification control portion performs a predetermined notification operation in accordance with the received ultrasonic waves that are based on the transmitted ultrasonic waves. Specifically, the notification control portion performs the predetermined notification operation when the distance judgement portion has continuously judged that the object is within a predetermined close range.

Under circumstances where the ultrasonic sensor is constantly subjected to water flow, it is possible that the distance judgment portion continuously has judged that the object is within a predetermined close range even if there is actually no object therearound within the predetermined close range. Under these circumstances, the distance history of the distance to the object, which is judged by the distance judgment portion, would indicate an abnormal appearance of the object within the predetermined close range.

In other words, when there is actually the object, such an object is sensed within the predetermined close range after being sensed outside the predetermined close range. In this case, when there is actually the object, the distance history does not indicate an abnormal appearance of the object within the predetermined close range.

In contrast, under circumstances where the ultrasonic sensor is constantly subjected to water flow, an object therearound is first sensed within the predetermined close range without having ever being sensed outside the predetermined close range. So, in this case, the distance history of the distance to an object therearound indicates an abnormal appearance of an object within the predetermined close range. Specifically, for example, the distance judgement portion, which has performed that the judgement that object is within a predetermined long range or a predetermined extreme long range, is changed to judge that the object is within the predetermined close range. For another example, the distance judgement portion judges that the object is within the predetermined close range immediately after object detection conditions are satisfied, the object detection conditions including: a shift position of a vehicle in which the object sensing device is installed is placed in one of a drive positions including a reverse position; and a traveling speed of the vehicle is within a predetermined low speed range. In either example, the notification control portion does not perform the predetermined notification operation.

As described above, the above-described configuration is capable of achieving appropriate notification control according to the presence or absence of a constant flow of water on the ultrasonic sensor based on characteristics indicated by the judgment history of a distance to the object. In other words, the above-described configuration is capable of minimizing abnormal detections under circumstances where the ultrasonic sensor is constantly subjected to water flow.

Each reference code in brackets, given to a component in the application documents, indicates a mere example of the correspondence between the component and a specific means described in the following embodiments. So, the present disclosure should not be limited to any extent by the reference codes given thereto.

Hereinafter, an embodiment will be described based on the drawings. To avoid interfering with explanation and understanding of the present embodiment, variations thereof will be described at the end, instead of during, description of the embodiment.

[Entire Configuration]

Figure 2:
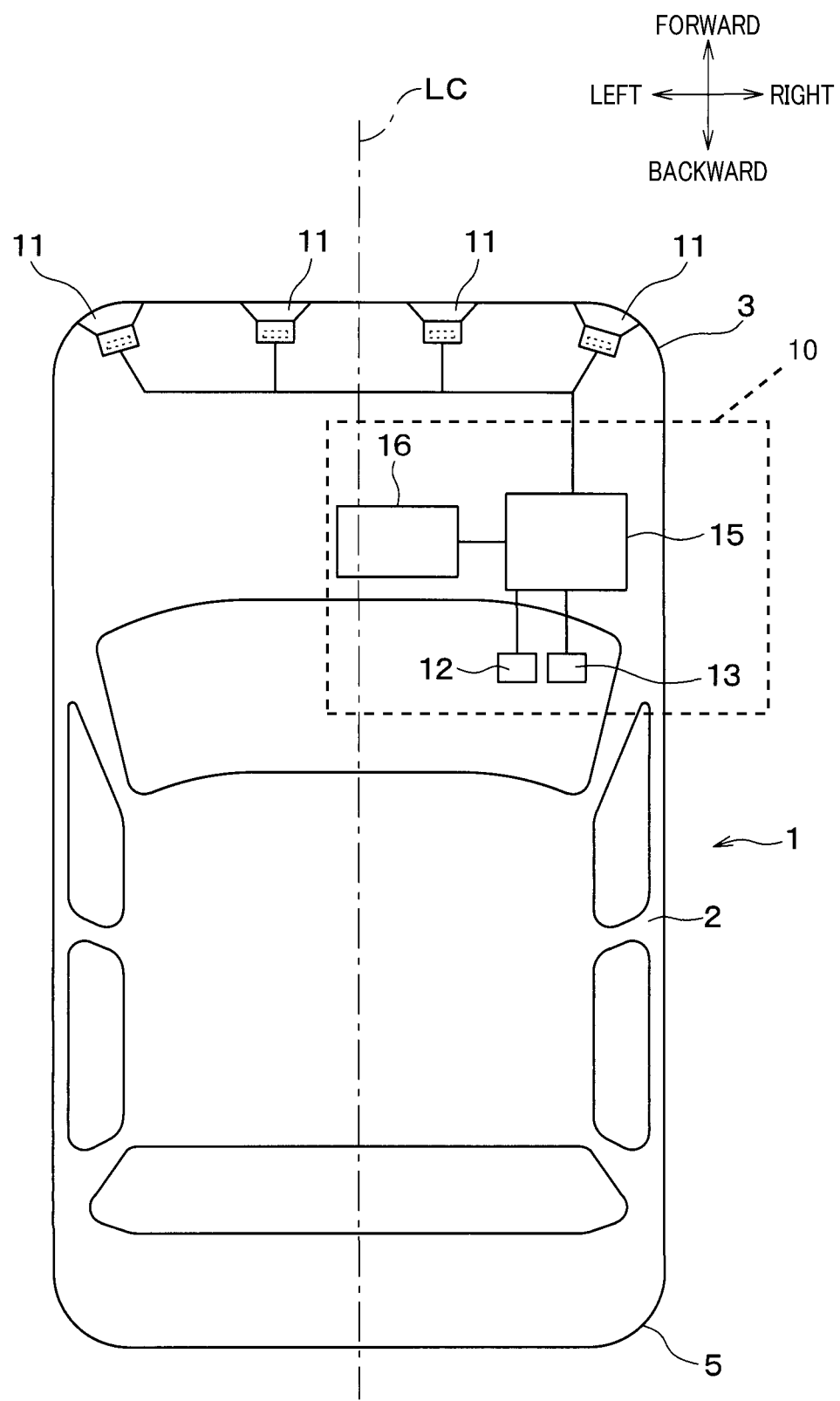
FIG. 2 is a block diagram illustrating a comprehensive configuration of the object sensing device exemplified in FIG. 1.

As referred to FIGS. 1 and 2, a vehicle 1 is what is called a four-wheel vehicle, being provided with a car body 2 that is seen almost rectangular in shape in planar view. The relative directions of the vehicle 1 and the car body 2, "up", "down", "forward", "backward", "left", and "right" are indicated by arrows in FIGS. 1 and 2. Hereinafter, right and left will be also referred to as "vehicle width directions". Forward and backward will be also referred to as "vehicle length directions". Vehicle length directions are parallel to a vehicle center line LC running through the center of the car body 2 in vehicle width directions.

The car body 2 has a front bumper 3 attached to its fore-end. A front grille 4 is disposed above the front bumper 3. The car body 2 has a rear bumper 5 attached to its rear-end.

The vehicle 1 is loaded with an object sensing device 10. The object sensing device 10 is configured to, when it is loaded in the vehicle 1, sense an object in the vicinity of the vehicle 1 by using at least one of a plurality of ultrasonic sensors 11. The object sensing device 10 may also be referred to as an "obstacle sensing device".

The front bumper 3 has multiple ultrasonic sensors 11 mounted thereon. The ultrasonic sensors 11 mounted on the front bumper 3 are arranged at intervals in vehicle width directions. The ultrasonic sensors 11 are mounted on the front bumper 3 such that they transmit ultrasonic waves forward of the vehicle 1 and receive ultrasonic waves from the front of the vehicle 1.

Similarly, the rear bumper 5 has multiple ultrasonic sensors 11 that are mounted thereon such that they transmit ultrasonic waves backward of the vehicle 1 and receive ultrasonic waves from behind of the vehicle 1. For simplicity of illustration, the ultrasonic sensors 11 attached to the rear bumper 5 are omitted in the figures. The ultrasonic sensors 11 have circuitry inside, which will be later described in detail.

The object sensing device 10 is provided with: a vehicle speed sensor 12; a shift lever position sensor 13; an object sensing ECU 15; and a notification portion 16, as well as the ultrasonic sensors 11. ECU is an abbreviation for electronic control unit.

The ultrasonic sensors 11 are connected to the object sensing ECU 15 through a vehicle-installed network, for example. Similarly, the vehicle speed sensor 12, the shift lever position sensor 13, and the notification portion 16 are connected to the object sensing ECU 15 through the vehicle-installed network.

The vehicle speed sensor 12 are mounted such that it generates an electric output (e.g. voltage) corresponding to a driving speed of the vehicle 1 i.e. a vehicle speed. The shift lever position sensor 13 is mounted such that it outputs electrical signals corresponding to a shift lever position of the vehicle 1.

The object sensing ECU 15 is a vehicle-installed microcomputer that controls the entire operations of the object sensing device 10, being provided with a CPU, ROM, RAM, a non-volatile RAM, and the like that are not illustrated in the figures. The object sensing ECU 15 is configured such that it is capable of controlling various operations by the CPU running programs from the ROM or the non-volatile RAM. The non-volatile RAM is a flash ROM, for example.

Specifically, the object sensing ECU 15 is configured to make the ultrasonic sensors 11 individually transmit and receive ultrasonic waves upon predetermined conditions for object detection being satisfied. The conditions for object detection include: the shift lever is placed in any of the drive positions including reverse; and the vehicle speed is within a predetermined low speed range (e.g. a range of 10 km/h or less). The object sensing ECU 15 is further configured to acquire, through a vehicle-installed network, for example, a result of ultrasonic waves transmitted and received individually by the ultrasonic sensors 11, and sense an object in the vicinity of the vehicle 1 based on the acquired results. These functions of the object sensing ECU 15 will be later described in detail.

The notification portion 16 is provided such that it performs an appropriate notification operation depending on a judgment made by the object sensing ECU 15 based on a result of ultrasonic waves transmitted and received individually by the ultrasonic sensors 11. Specifically, the notification portion 16 is provided with: a display that displays a result of object sensing and the like; and an audio output portion that gives an audio notification due to a result of object sensing and the like. "Audio notifications" here include beep sounds.

In the present embodiment, the notification operations include object notification operations and abnormal notification operations. The object notification operations include the operation of giving, when an actually present object is sensed in the vicinity of the vehicle 1, a display and/or audio output of information regarding a relative direction of the vehicle 1 to the object and a distance of the vehicle 1 to the object. In other words, object notification operations include operations of giving a display and/or audio output of information regarding how close to the object a part (e.g. the front-right or rear-left corner) of the car body 2 is. abnormal notification operations include operation of giving a display and/or audio output of a notification due to the presence of a foreign substance attached to the ultrasonic sensor 11.

[Configuration of the Ultrasonic Sensor]

The ultrasonic sensor 11 is configured to output, based on a result of ultrasonic waves transmitted and received thereby, electrical signals corresponding to a distance to an object therearound. Specifically, as referred to FIG. 3, the ultrasonic sensor 11 is provided with: an ultrasonic microphone 41; a transmitter circuit 42; a receiver circuit 43; a reverberation time calculation portion 44; a sensor control portion 45; and an input-output interface 46.

The ultrasonic microphone 41 is configured to transmit probe waves that are ultrasonic waves, in response to driving signals outputted by the transmitter circuit 42. The ultrasonic microphone 41 is further configured to output, for the receiver circuit 43, electrical signals corresponding to ultrasonic waves received by the ultrasonic microphone 41 itself; the received ultrasonic waves include probe waves reflected from an object therearound.

The receiver circuit 43 is configured to perform signal processing such as amplification and filtering on signals outputted by the ultrasonic microphone 41 and output processed signals for the reverberation time calculation portion 44 and the sensor control portion 45. The reverberation time calculation portion 44 is configured to calculate a reverberation time of the ultrasonic microphone 41 based on a result of ultrasonic waves transmitted and received by the ultrasonic microphone 41 and output a calculated result for the sensor control portion 45.

The sensor control portion 45 is configured to control the entire operations of the ultrasonic sensor 11. Specifically, the sensor control portion 45 is configured to make the transmitter circuit 42 output driving signals by taking control of the transmitter circuit 42. The sensor control portion 45 is further configured to calculate a distance to an object therearound based on signals processing result by the receiver circuit 43. The sensor control portion 45 is still further configured to output a distance calculating result and a reverberation time calculated by the reverberation time calculation portion 44, for the object sensing ECU 15 through the input-output interface 46. The input-output interface 46 is mounted such that it transmits and receives signals to and from the object sensing ECU 15 and the like through a vehicle-installed network, for example.

[Configuration of the Object Sensing ECU)

As referred to FIG. 3, the object sensing ECU 15 has a distance judgment portion 51, a reverberation time acquirement portion 52, and a notification control portion 53, as a functional configuration of the CPU.

The distance judgment portion 51 is configured to judge the distance to an object therearound based on a result of ultrasonic waves transmitted and received by the ultrasonic sensor 11. Specifically, the distance judgment portion 51 is configured to judge which of the following ranges the distance to an object therearound falls within: a close range, a medium range, a long range, or an extreme long range. The close range is less than 30 cm (~11.8 inches), for example. The medium range is 30 cm (~11.8 inches) or more, and less than 50 cm (~19.7 inches), for example. The long range is 50 cm (~19.7 inches) or more, and less than 1 m, for example. The extreme long range is 1 m (~39.4 inches) or more, and less than 1.5 m (~59.1 inches), for example. When the distance between the ultrasonic sensor 11 and an object is an upper limit of the extreme long range (in the above example, 1.5 m) and more, it is judged that there is no object in the vicinity of the ultrasonic sensor 11.

The reverberation time acquirement portion 52 is configured to acquire a reverberation time of the ultrasonic sensor 11. Specifically, the reverberation time acquirement portion 52 is configured to receive a reverberation time calculated by the reverberation time calculation portion 44 of the ultrasonic sensor 11, through a vehicle-installed network, for example.

The notification control portion 53 is configured to perform a predetermined notification operation based on a result of ultrasonic waves transmitted and received by the ultrasonic sensor 11, by controlling the operations of the notification portion 16. Specifically, the notification control portion 53 is configured to perform an object notification operation and an abnormal notification operation based on a judgment made by the distance judgment portion 51 and a reverberation time acquired by the reverberation time acquirement portion 52.

In the present embodiment, the notification control portion 53 is configured to perform a close-range notification operation when the distance judgment portion 51 has continuously judged that the object is within the predetermined close range. The close-range notification operation is a notification operation of the presence of an object within the close range. Furthermore, the notification control portion 53 is configured to perform a mid-range notification operation when the distance judgment portion 51 has continuously judged that the object is within the predetermined medium range. The same is true for a long-range judgement and a long-range notification operation, and for an extreme long-range judgement and an extreme long-range notification operation.

Furthermore, in the present embodiment, the notification control portion 53 is configured to perform an abnormal notification operation when an acquired reverberation time is less than a threshold.

Brief Description of Operations

Hereinafter, the operations of the object sensing device 10 having the above-described configuration will be briefly described along with effects produced by the configuration.

The object sensing ECU 15 judges whether the conditions for object detection are satisfied, based on signals output by the vehicle speed sensor 12 and the shift lever position sensor 13. Upon the conditions for object detection being satisfied, the object sensing ECU 15 performs an object sensing operation by making the ultrasonic sensors 11 individually repeat transmission and reception of ultrasonic waves at predetermined intervals.

In other words, based on a result of ultrasonic waves transmitted and received by the ultrasonic sensors 11, the distance judgment portion 51 judges the distance to an object therearound and the notification control portion 53 performs a predetermined notification operation.

Specifically, under circumstances where a foreign substance is attached to the ultrasonic sensor 11 i.e. the ultrasonic microphone 41, the reverberation time becomes shorter than normal (see Japanese Patent Application Publication No. 2003-248050, for example). So, when an acquired reverberation time is less than a threshold, the notification control portion 53 performs an abnormal notification operation representing that a foreign substance is attached to the ultrasonic sensor 11.

When an acquired reverberation time is equal to or greater than a threshold, it is judged that the abnormal due to a foreign substance attachment has not occurred, and thus the notification control portion 53 performs an object notification operation based on an object sensing result. Specifically, for example, the notification control portion 53 performs a close-range notification operation when the distance judgment portion 51 continuously succeeds in a close-range judgment indicating the presence of an object within a predetermined close range.

When it rains heavily, for example, the ultrasonic sensor 11 is constantly subjected to water flow. Under such circumstances, the resonance frequency of the ultrasonic sensor 11 tends to change, causing the reverberation time to become longer. Under the circumstances, it is possible that, even if there is actually no object within the close range, the notification control portion 53 may erroneously perform a close-range notification operation, by the distance judgment portion 51 has continuously judged that the object is within the predetermined close range. Even under these circumstances, the judgement history of the distance to the object by the distance judgement portion 51 indicates an abnormal appearance of the object within the close range.

In other words, when there is actually an object therearound, such an object is sensed within the close range after being sensed outside the close range i.e. within the medium or long range. So, when there is actually an object therearound, the judgement history of the distance to the object does not indicate an abnormal appearance of the object within the close range.

In contrast, under circumstances where the ultrasonic sensor 11 is constantly subjected to water flow, an object is first sensed within the close range without having ever being sensed outside the close range. For example, the distance judgement portion 51 judges that the object is within the close range immediately after object detection conditions are satisfied. Thus, in this case, a judgement history of the distance to the object indicates an abnormal appearance of the object within the close range. "an abnormal appearance of the object within the close range" may also be expressed as "a sudden appearance of an object within the close range" or "an abnormal detection of an object within the close range".

The notification control portion 53 does not perform a close-range notification operation even if the distance judgment portion 51 has continuously judged that the object is within a close range, under the condition that the judgement history of the distance to the object indicates an abnormal appearance of the object within the close range. In other words, the notification control portion 53 performs a close-range notification operation under the condition that the distance history, which is constituted by the distances judged by the distance judgment portion 51, does not indicate an abnormal appearance of an object within the close range.

Specifically, for example, the notification control portion 53 does not perform a close-range notification operation when the distance judgement portion 51, which has judged that object is not within a predetermined extreme long range, is changed to judge that the object is within the close range. For another example, the notification control portion 53 does not perform a close-range notification operation when the distance judgment portion 51 has judged that the object is within the close range immediately after object detection conditions are satisfied.

As described above, the configuration of the present embodiment is capable of achieving appropriate notification control depending on the presence or absence of a constant flow of water on the ultrasonic sensor 11 based on characteristics indicated by the judgement history of the distance to the object. In other words, the configuration is capable of minimizing abnormal detections and abnormal notifications under circumstances where the ultrasonic sensor 11 is constantly subjected to water flow.

The device disclosed in Patent Literature 1 performs an abnormal notification operation representing that a foreign substance is attached when an object has been sensed constantly for a certain period of time since it was first sensed in close proximity. However, the device has a problem under circumstances where the ultrasonic sensor 11 is constantly subjected to water flow as described above: the device erroneously gives a notification representing the attaching of a foreign substance.

In contrast, in the present embodiment, the notification control portion 53 performs an abnormal notification operation representing that a foreign substance is attached to the ultrasonic sensor 11 when an acquired reverberation time is less than a threshold. Furthermore, the notification control portion 53 performs a close-range notification operation when an acquired reverberation time is equal to or greater than a threshold and the distance judgment portion 51 has continuously judged that the object is within a predetermined close range. When the distance judgment indicates an abnormal appearance of an object within the close range, even if an acquired reverberation time is equal to or greater than a threshold and the distance judgment portion 51 has continuously judged that the object is within a predetermined close range, the notification control portion 53 does not perform a close-range notification operation. As described above, the configuration is capable of minimizing erroneous detection and erroneous notification in abnormal notification and close-range notification.

Concrete Example

Hereinafter, a concrete example of the operations performed with the configuration of the present embodiment will be described based on a flowchart. In the figures and the following descriptions in this specification, "Step" will be abbreviated as "S" for simplicity.

Figure 4A:
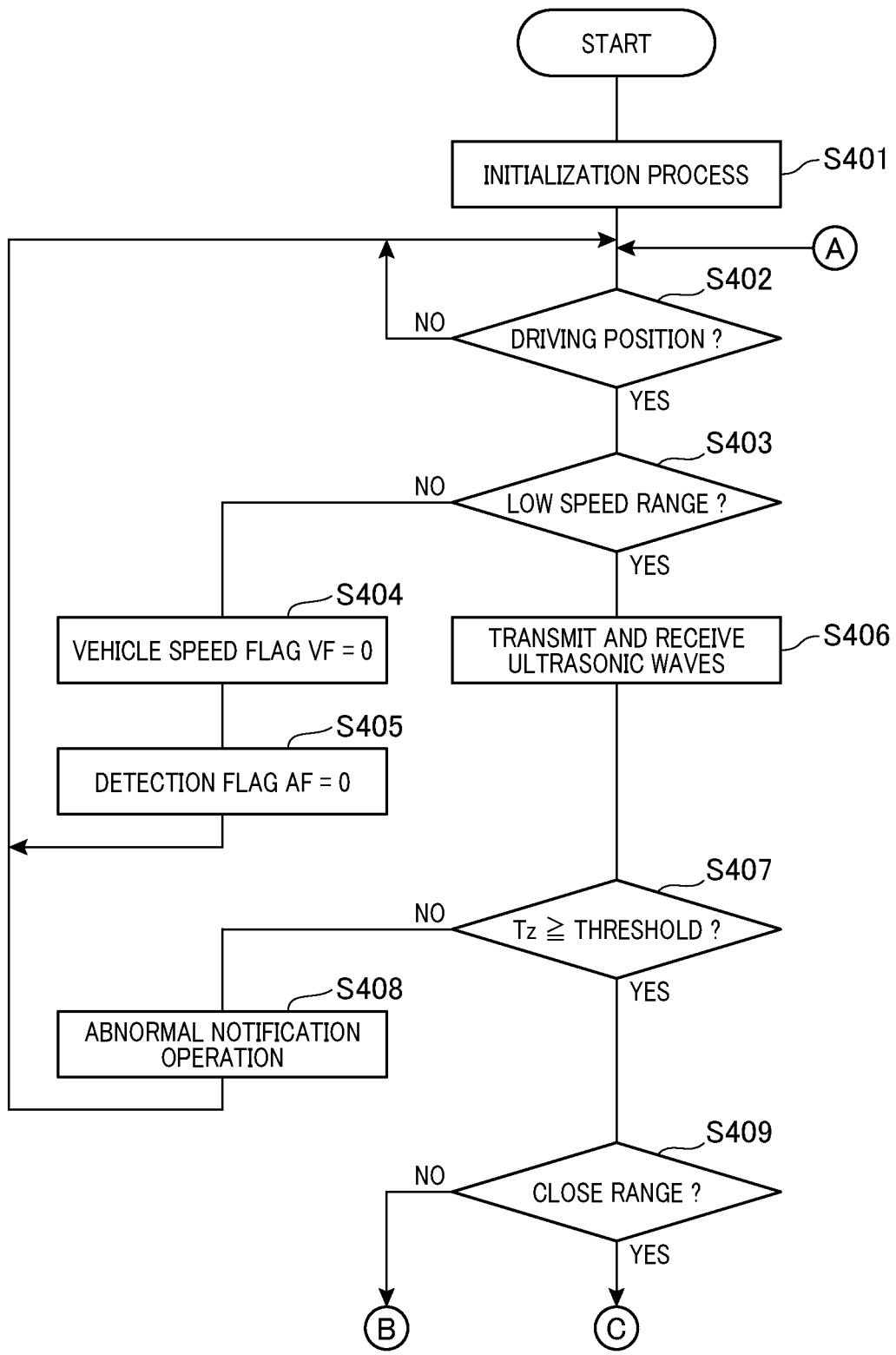
FIG. 4A is a flowchart representing the operations of the object sensing device exemplified in FIG. 2, as an example.
Figure 4B:
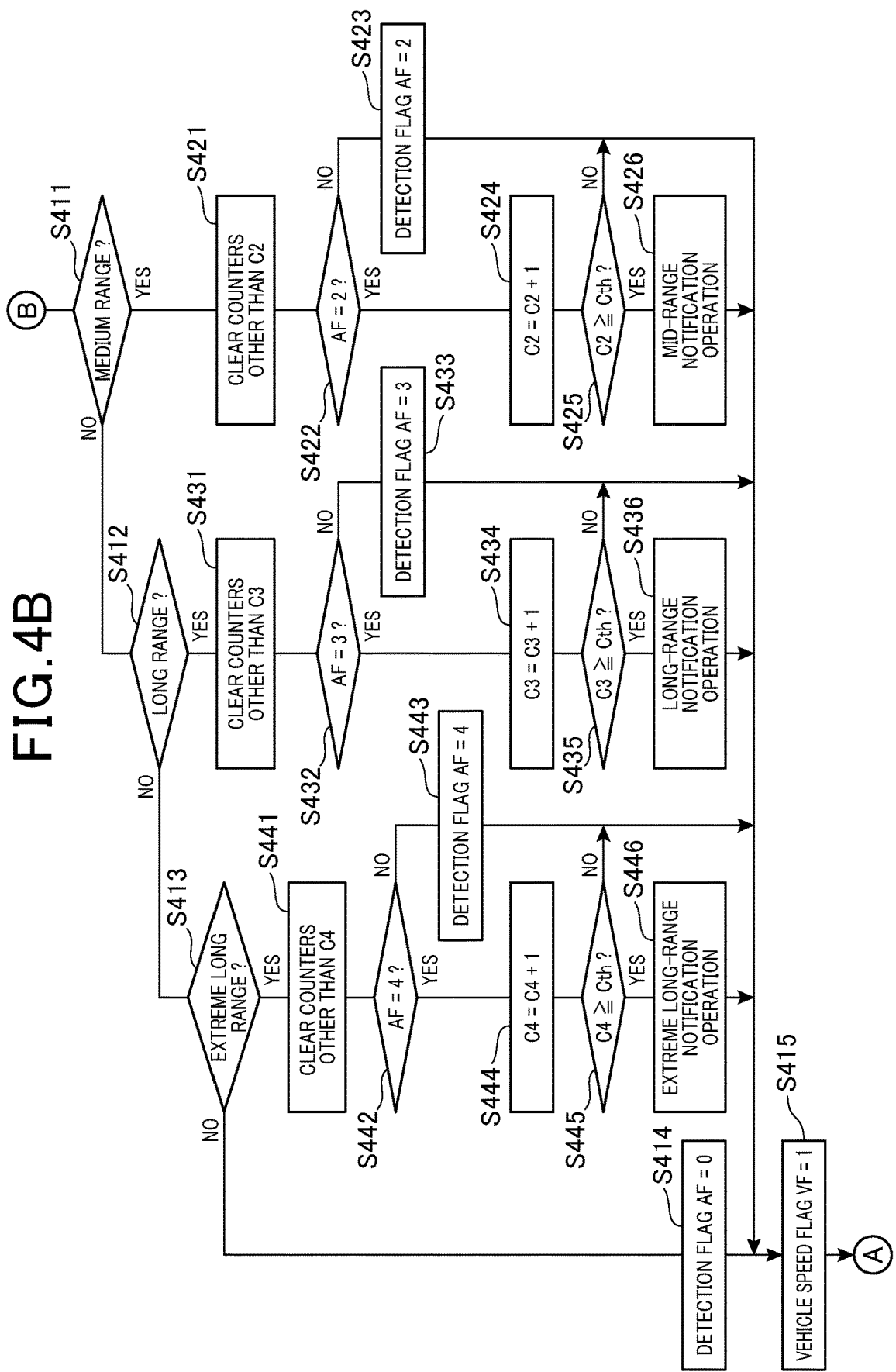
FIG. 4B is a flowchart representing the operations of the object sensing device exemplified in FIG. 2, as an example.
Figure 4C:
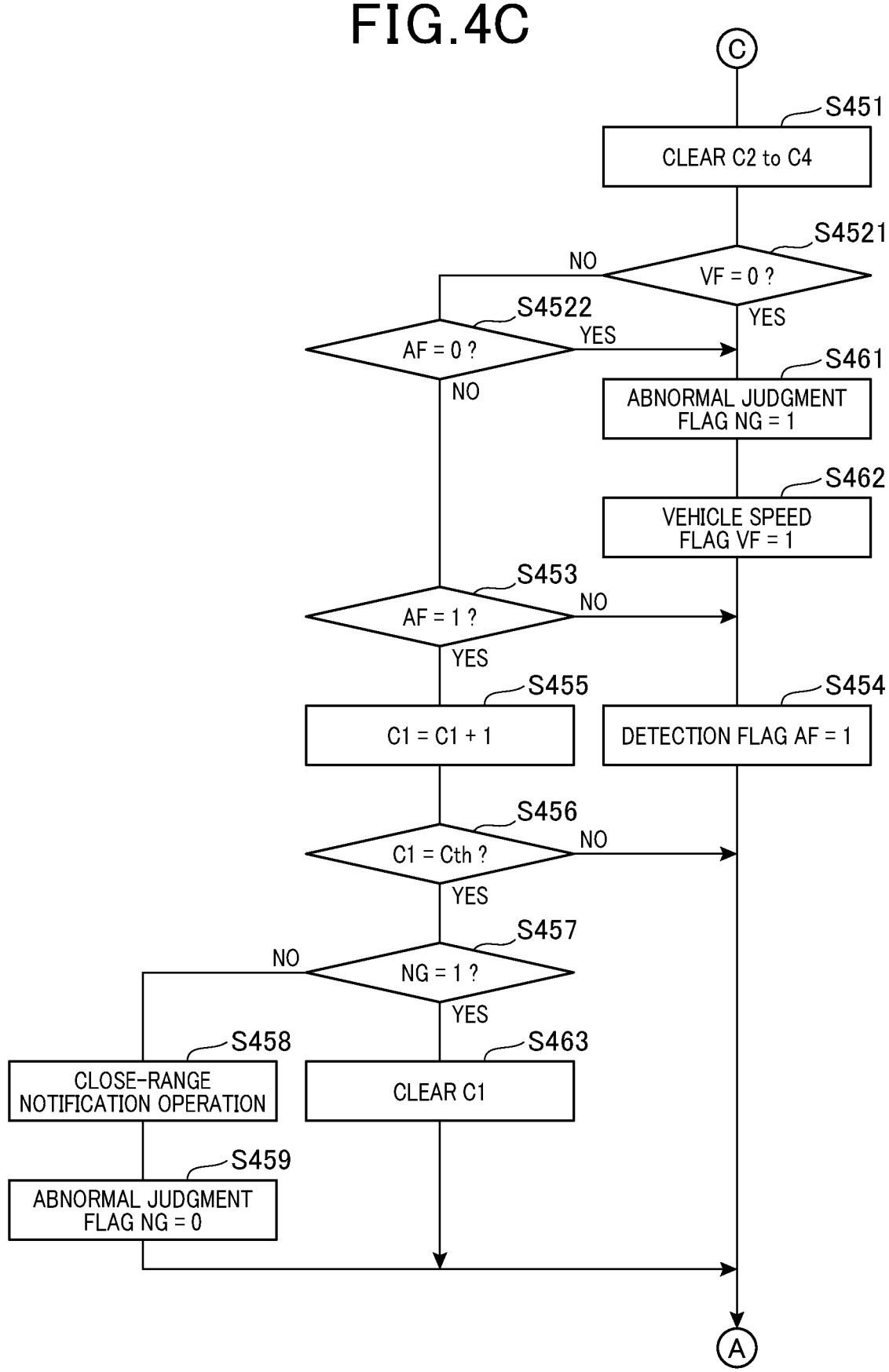
FIG. 4C is a flowchart representing the operations of the object sensing device exemplified in FIG. 2, as an example.

Upon an ignition switch of the vehicle 1 being turned on, the object sensing ECU 15 starts a procedure shown in FIGS. 4A to 4C.

First, in S401, the object sensing ECU 15 performs an initialization process. The initialization process includes the process of setting various flags and counters to their default values. In S402, the object sensing ECU 15 judges whether the shift lever is placed in a drive position.

If the shift lever is placed in a park position or a neutral position instead of a drive position (S402: NO), the object sensing ECU 15 makes the procedure return to S402. If the shift lever is placed in a drive position (S402: YES), the object sensing ECU 15 makes the procedure proceed to S403 and the following steps.

In S403, the object sensing ECU 15 judges whether the vehicle speed falls within a low speed range. If the vehicle speed falls within a medium speed range or a high speed range (S403: NO), the object sensing ECU 15 performs the processes of S404 and S405, then makes the procedure return to S402. If the vehicle speed falls within a low speed range (S403: YES), the object sensing ECU 15 makes the procedure proceed to S406 and the following steps.

In S404, the object sensing ECU 15 sets a vehicle speed flag VF to "0", a value indicating that the vehicle speed is within a medium speed range or a high speed range. In Step S405, the object sensing ECU 15 sets a detection flag AF corresponding to an object sensing result to "0", a value indicating the absence of an object therearound.

In Step S406, the object sensing ECU 15 makes the ultrasonic sensor 11 transmit and receive ultrasonic waves by controlling the operations of the ultrasonic sensor 11. Furthermore, the object sensing ECU 15 acquires a result of ultrasonic waves transmitted and received by the ultrasonic sensor 11, through a vehicle-installed network, for example. Specifically, the object sensing ECU 15 acquires a reverberation time Tz and the distance to an object therearound, which is a calculated distance.

In S407, the object sensing ECU 15 judges whether the reverberation time Tz is equal to or greater than a threshold. If the reverberation time Tz is less than a threshold (S407: NO), the object sensing ECU 15 performs the process of S408, then makes the procedure return to S402. In S408, the object sensing ECU 15 performs an abnormal notification operation representing that a foreign substance is attached to the ultrasonic sensor 11.

If the reverberation time Tz is equal to or greater than a threshold (S407: YES), the object sensing ECU 15 advances the procedure to S409. In S409, based on the calculated distance acquired in S406, the object sensing ECU 15 judges whether the distance judgment result judged by the distance judgment portion 51 is within the close range, in other words, whether there is an object within the close range.

Normally, as discussed earlier, no object suddenly appears within the close range. When this step comes right after "YES" results from S403, in other words, when this step comes right after the conditions for object detection are satisfied, "NO" results from S409. When this step comes right after the conditions for object detection are satisfied, the vehicle speed flag VF=0 is true because this is before VF is changed from 0 to 1, with 1 being a value corresponding to a low speed range in S415 or the like described below.

If the distance judgment result is not within the close range (S409: NO), the object sensing ECU 15 makes the procedure proceed to S411. In S411, the object sensing ECU 15 judges whether the distance judged by the distance judgment portion 51 is within the medium range, in other words, whether there is an object within the medium range.

If the distance judgment result is not within the medium range (S411: NO), the object sensing ECU 15 makes the procedure proceed to S412. In S412, the object sensing ECU 15 judges whether the distance judged by the distance judgment portion 51 is within the long range, in other words, whether there is an object within the long range.

If the distance judgment result is not within the long range (S412: NO), the object sensing ECU 15 makes the procedure proceed to S413. In S413, the object sensing ECU 15 judges whether the distance judged by the distance judgment portion 51 is within the extreme long range, in other words, whether there is an object within the extreme long range.

If the distance judgment result is not within the extreme long range (S412: NO), the object sensing ECU 15 performs the processes of S414 and S415, then makes the procedure return to S402. In Step S414, the object sensing ECU 15 sets the detection flag AF to "0". In S415, the object sensing ECU 15 sets the vehicle speed flag VF to "1", a value corresponding to a low speed range.

If the distance judgment result is within the medium range (S411: YES), the object sensing ECU 15 makes the procedure proceed to S421 and S422. In S421, the object sensing ECU 15, having counters C1 to C4, clears the counters other than the counter C2.

In S422, the object sensing ECU 15 judges whether the detection flag AF currently indicates "2", a value corresponding to the medium range. In other words, the object sensing ECU 15 judges whether the distance judgment result was within the medium range the last time as it is this time.

If the distance judgment result was not within the medium range the last time unlike this time (S422: NO), the object sensing ECU 15 performs the process of S423, then makes the procedure return to S402. In S423, the object sensing ECU 15 sets the detection flag AF to "2", a value corresponding to the medium range.

If the distance judgment result was within the medium range the last time as it is this time (S422: YES), the object sensing ECU 15 makes the procedure proceed to S424 and S425. In S424, the object sensing ECU 15 increments the counter C2 by one. In S425, the object sensing ECU 15 judges whether the counter C2 reaches a predetermined value Cth. In other words, the object sensing ECU 15 judges whether the distance judgement portion has continuously judged that the object is within a medium range for Cth times.

If the distance judgement portion has continuously judged that the object is within a medium range for Cth times (S425: YES), the object sensing ECU 15 performs the process of S426, then makes the procedure return to S402. In S426, the object sensing ECU 15 performs a mid-range notification operation. If the distance judgment result has not been within the medium range Cth times consecutively (S425: NO), the object sensing ECU 15 skips the process of S426, then makes the procedure return to S402.

If the distance judgment result is within the long range (S412: YES), the object sensing ECU 15 makes the procedure proceed to S431 and S432. In S431, the object sensing ECU 15, having the counters C1 to C4, clears the counters other than the counter C3.

In S432, the object sensing ECU 15 judges whether the detection flag AF currently indicates "3", a value corresponding to the long range. In other words, the object sensing ECU 15 judges whether the distance judgment result was within the long range the last time as it is this time.

If the distance judgment result was not within the long range the last time unlike this time (S432: NO), the object sensing ECU 15 performs the process of S433, then makes the procedure return to S402. In S433, the object sensing ECU 15 sets the detection flag AF to "3", a value corresponding to the long range.

If the distance judgment result was within the long range the last time as it is this time (S432: YES), the object sensing ECU 15 makes the procedure proceed to S434 and S435. In S434, the object sensing ECU 15 increments the counter C3 by one. In S435, the object sensing ECU 15 judges whether the counter C3 reaches a predetermined value Cth. In other words, the object sensing ECU 15 judges whether the distance judgement portion has continuously judged that the object is within a long range for Cth times.

If the distance judgement portion has continuously judged that the object is within a long range for Cth times (S435: YES), the object sensing ECU 15 performs the process of S436, then makes the procedure return to S402. In S436, the object sensing ECU 15 performs a long-range notification operation. If the distance judgment result has not been within the long range Cth times consecutively (S435: NO), the object sensing ECU 15 skips the process of S436, then makes the procedure return to S402.

If the distance judgment result is within the extreme long range (S413: YES), the object sensing ECU 15 makes the procedure proceed to S441 and S442. In S441, the object sensing ECU 15, having the counters C1 to C4, clears the counters other than the counter C4.

In S442, the object sensing ECU 15 judges whether the detection flag AF currently indicates "4", a value corresponding to the extreme long range. In other words, the object sensing ECU 15 judges whether the distance judgment result was within the extreme long range the last time as it is this time.

If the distance judgment result was not within the extreme long range the last time unlike this time (S442: NO), the object sensing ECU 15 performs the process of S443, then makes the procedure return to S402. In S433, the object sensing ECU 15 sets the detection flag AF to "4", a value corresponding to the extreme long range.

If the distance judgment result was within the extreme long range the last time as it is this time (S442: YES), the object sensing ECU 15 makes the procedure proceed to S444 and S445. In S444, the object sensing ECU 15 increments the counter C4 by one. In S445, the object sensing ECU 15 judges whether the counter C4 reaches a predetermined value Cth. In other words, the object sensing ECU 15 judges whether the distance judgment result has been within the extreme long range Cth times consecutively.

If the distance judgement portion has continuously judged that the object is within an extreme long range for Cth times (S445: YES), the object sensing ECU 15 performs the process of S446, then makes the procedure return to S402. In S446, the object sensing ECU 15 performs an extreme long-range notification operation. If the distance judgment result has not been within the extreme long range Cth times consecutively (S445: NO), the object sensing ECU 15 skips the process of S446, then makes the procedure return to S402.

If the distance judgment result is within the close range (S409: YES), the object sensing ECU 15 makes the procedure proceed to S451 and the following steps. In S451, the object sensing ECU 15, having the counters C1 to C4, clears the counters other than the counter C1. In S4521, the object sensing ECU 15 judges whether the vehicle speed flag VF indicates "0".

The procedure reaches S4521 after the distance judgment result is confirmed to be within the close range in S409 (S409: YES). Normally, as discussed earlier, no object suddenly appears within the close range. So, normally, the distance judgment result is confirmed to be within the medium range, the long range, or the extreme long range; and the vehicle speed flag VF thus should have been set to "1", a value corresponding to a low speed range, in S415.

So, normally, the vehicle speed flag VF indicates "1" (S4521: NO). In this case, the object sensing ECU 15 makes the procedure proceed to S4522.

In S4522, the object sensing ECU 15 judges whether the detection flag AF currently indicates "0", a value indicating the absence of an object. In other words, the object sensing ECU 15 judges whether the distance judgment portion 51 succeeds in a close-range judgment without having ever succeeded in an extreme long-range judgement indicating the presence of an object within the extreme long range.

Normally, as discussed earlier, no object suddenly appears within the close range. So, normally, the distance judgment portion 51 should have performed a mid-range judgment (AF=2), a long-range judgement (AF=3), or an extreme long-range judgement (AF=4) before has performed a close-range judgment this time.

So, normally, the detection flag AF indicates a value other than "0" (S4522: NO). In this case, the object sensing ECU 15 makes the procedure proceed to S453.

In S453, the object sensing ECU 15 judges whether the detection flag AF currently indicates "1", a value corresponding to the close range. In other words, the object sensing ECU 15 judges whether the distance judgment result was within the close range the last time as it is this time.

If the distance judgment result was not within the close range the last time unlike this time (S453: NO), the object sensing ECU 15 performs the process of S454, then makes the procedure return to S402. In S454, the object sensing ECU 15 sets the detection flag AF to "1", a value corresponding to the close range.

If the distance judgment result was within the close range the last time as it is this time (S453: YES), the object sensing ECU 15 makes the procedure proceed to S455 and S456. In S455, the object sensing ECU 15 increments the counter C1 by one. In S456, the object sensing ECU 15 judges whether the counter C1 reaches a predetermined value Cth. In other words, the object sensing ECU 15 judges whether the distance judgement portion has continuously judged that the object is within a close range for Cth times.

If the distance judgement portion has not continuously judged that the object is within a close range for Cth times (S456: NO), the object sensing ECU 15 makes the procedure return to S402. If the distance judgement portion has continuously judged that the object is within a close range for Cth times (S456: YES), the object sensing ECU 15 makes the procedure proceed to S457.

In S457, the object sensing ECU 15 judges whether an abnormal judgment flag NG is set, in other words, whether NG=1 is true. The abnormal judgment flag NG indicates whether the ultrasonic sensor 11 is constantly subjected to water flow. Specifically, if NG=1 is true, it means that the ultrasonic sensor 11 is constantly subjected to water flow.

Normally, the abnormal judgment flag NG is not set (NG=0). So, in this case, "NO" results from S457. Subsequently, the object sensing ECU 15 performs the processes of S458 and S459, then makes the procedure return to S402. In S458, the object sensing ECU 15 performs a close-range notification operation. In S459, the object sensing ECU 15 resets the abnormal judgment flag NG (NG=0).

Under circumstances where the ultrasonic sensor 11 is constantly subjected to water flow, the judgment history of the distance to the object indicates an abnormal appearance of an object within the close range. This means, the distance judgment portion 51 succeeds in a close-range judgment without having ever succeeded in a mid-range judgment, a long-range judgement, or an extreme long-range judgement.

For example, the distance judgment portion 51 may perform the judgement that the object is within the predetermined close range immediately after object detection conditions are satisfied. In this case, VF=0 is true because this is before S415 where the vehicle speed flag VF is changed from "0" to "1", a value corresponding to a low speed range. So, in this case, "YES" results from S4521. Subsequently, the object sensing ECU 15 makes the procedure proceed to Step S461 and S462, performs the process of S454, then makes the procedure return to S402.

For another example, the distance judgment portion 51, which has performed that the judgement that object is not within an extreme long range, may be changed to judge that the object is within the close range. Specifically, the distance judgment portion 51 first succeeds in a close-range judgment after low speed range (VF=1) and absence of an object (AF=0) are satisfied. So, in this case, "YES" results from S4522. Subsequently, the object sensing ECU 15 makes the procedure proceed to Step S461 and S462, performs the process of S454, then makes the procedure return to S402.

In S461, the object sensing ECU 15 sets the abnormal judgment flag NG (NG=1). In S462, the object sensing ECU 15 sets the vehicle speed flag VF to "1", a value corresponding to a low speed range.

Under circumstances where the ultrasonic sensor 11 is constantly subjected to water flow, it is possible that the distance judgement portion has continuously judged that the object is within a close range for Cth times while the abnormal judgment flag NG is being set. As discussed earlier, however, this is a case caused by water flow, not by the presence of an object.

So, in this case, "YES" results from S457 even if the distance judgement portion has continuously judged that the object is within a close range for Cth times (S456: YES). Subsequently, the object sensing ECU 15 performs the process of S463, then makes the procedure return to S402.

In S463, the object sensing ECU 15 clears the counter C1 (C1=0). In other words, the object sensing ECU 15 does not perform a close-range notification operation when the distance judgement portion has continuously judged that the object is within a predetermined close range for Cth times because of water flow.

[Variation]

The present disclosure should not be limited to the above-described embodiment. So, the above-described embodiment can be modified as deemed appropriate. Hereinafter, representative variations will be described in detail. The following description will primarily focus on the differences between the above-described embodiment and the variation. The above-described embodiment and the variation have parts in common, which are identical or equal with the same codes. Unless there is a technical contradiction or a special supplementary explanation, the description of the above-described embodiment can be applied as appropriate to such components with the same codes in the variation to be described below.

The present disclosure is not limited to the device configuration concretely detailed in the above-described embodiment. In other words, for example, the vehicle 1 is not limited to a four-wheel vehicle. Specifically, the vehicle 1 may be a three-wheel vehicle or a six or eight-wheeler such as a truck.

Furthermore, the arrangement of the ultrasonic sensors 11 is not especially limited. For example, the ultrasonic sensors 11 may be mounted at the same or different angles of elevation and/or about the same or different heights from the base plane. One or more of the ultrasonic sensors 11 may be mounted on the front grille 4.

In the above-described embodiment, the object sensing ECU 15 is configured to run a program from the ROM, for example, by the CPU. The present disclosure, however, is not limited to this configuration. In other words, for example, the object sensing ECU 15 may be digital circuitry configured to achieve the operation above, such as a gate-array based ASIC. ASIC is an abbreviation for application specific integrated circuit.

In the above-described embodiment, the distance judgment portion 51, the reverberation time acquirement portion 52, and the notification control portion 53 are provided as a functional configuration of the object sensing ECU 15. The present disclosure, however, is not limited to this configuration. In other words, for example, at least one of the distance judgment portion 51, the reverberation time acquirement portion 52, and the notification control portion 53 may be provided as a function in the configuration of the sensor control portion 45 of the ultrasonic sensor 11.

The present disclosure is not limited to the operational examples and processing modes concretely detailed in the above-described embodiment. In other words, the definition of a low speed range is not limited to the concrete example given above. Similarly, the definitions of a close range, a medium range, a long range, and an extreme long range are not limited to the concrete examples given above. Furthermore, the extreme long range may be merged with the long range. Alternatively, the extreme long range may be omitted.

The flowcharts shown in FIGS. 4A to 4C may be modified as appropriate. Specifically, for example, the object sensing ECU 15 may discriminate between the presence of a foreign substance and the presence of a break in a cable based on the reverberation time Tz (see Japanese Unexamined Patent Application Publication No. 2003-248050, for example).

Needless to say, the components of the above-described embodiment are not necessarily essential unless explicitly described or they are fundamentally and obviously essential, for example. Furthermore, it should be understood that any numbers, values, amounts, ranges, and other numeric representations of the components in the present disclosure are in no way limited to those specified in the embodiment, unless explicitly described or they are fundamentally and obviously limited to those specified therein. Similarly, it should be understood that any shapes, orientations, locations, and other geometric and spatial representations of the components in the present disclosure are in no way limited to those specified in the embodiment, unless explicitly described or they are fundamentally and obviously limited to those specified therein.

The variation is not limited to the above-described example. Furthermore, multiple variations may be combined together. Furthermore, the above-described embodiment and any variations may be combined together in whole or in part.

What is claimed is:

1. An object sensing device for sensing an object therearound using an ultrasonic sensor, the object sensing device comprising:
   a distance judgement portion that performs a judgement of a distance to the object therearound in accordance with received ultrasonic waves that are based on transmitted ultrasonic waves by the ultrasonic sensor; and
   a notification control portion that performs a predetermined notification operation in accordance with the received ultrasonic waves that are based on the transmitted ultrasonic waves,
   wherein the notification control portion is configured to:
      perform the predetermined notification operation when the distance judgement portion has continuously judged that the object is within a predetermined close range; and
      not perform the predetermined notification operation when the distance judgement portion has continuously judged that the object is within the predetermined close range due to an abnormal appearance of the object within the predetermined close range based on a judgement history of the distance to the object by the distance judgement portion, the abnormal appearance of the object being a situation in which the distance judgement portion, which has judged that the object is not within a predetermined long range or a predetermined extreme long range, is changed to judge that the object is within the predetermined close range.

2. The object sensing device according to claim 1, wherein the abnormal appearance of the object is a situation in which the distance judgement portion, which has performed the judgement that the object is not within 1.5 m from the ultrasonic sensor, is changed to judge that the object is within a range of less than 30 cm from the ultrasonic sensor.

3. The object sensing device according to claim 1, wherein the notification control portion is configured to not perform the predetermined notification operation when the distance judgement portion has judged that the object is within the predetermined close range immediately after object detection conditions are satisfied, the object detection conditions including:
   a shift position of a vehicle in which the object sensing device is installed is placed in one of driving positions including a reverse position; and
   a traveling speed of the vehicle is within a predetermined low speed range.

4. The object sensing device according to claim 1, wherein the predetermined notification operation is a close-range notification operation representing that the object is within the predetermined close range.

5. The object sensing device according to claim 1, further comprising a reverberation time acquiring portion that acquires a reverberation time of the ultrasonic sensor, wherein the notification control portion is configured to:
   perform the predetermined notification operation when the acquired reverberation time is equal to or greater than a predetermined threshold and the distance judgement portion has continuously judged that the object is within the predetermined close range; and
   fail to perform the predetermined notification operation when the judgement history of the distance to the object by the distance judgement portion indicates the abnormal appearance of the object within the predetermined close range even if the acquired reverberation time is equal to or greater than the predetermined threshold and the distance judgement portion has continuously judged that the object is within the predetermined close range.

6. The object sensing device according to claim 5, wherein the notification control portion performs an abnormal notification operation when the acquired reverberation time is less than the predetermined threshold, the abnormal notification operation representing a presence of a foreign substance attached to the ultrasonic sensor.

* * * * *